United States Patent [19]

Deutschbein et al.

[11] 4,022,707
[45] May 10, 1977

[54] ATHERMAL LASER GLASS

[75] Inventors: Otto Deutschbein, Montrouge, France; Marga Faulstich, Darmstadt, Germany; Norbert Neuroth, Darmstadt, Germany; Walter Jahn, Darmstadt, Germany

[73] Assignee: Jenaer Glaswerk Schott & Gen., Mainz, Germany

[22] Filed: Nov. 17, 1975

[21] Appl. No.: 632,848

[30] Foreign Application Priority Data
Nov. 25, 1974 Germany .......................... 2455728

[52] U.S. Cl. ................. 252/301.6 P; 252/301.4 P; 106/47 R; 106/47 Q; 331/94.5 E
[51] Int. Cl.² ................. C09K 11/42; C09K 11/46; C03C 3/16; C03C 3/28
[58] Field of Search .............. 252/301.4 P, 301.6 P; 331/94.5 E; 106/47 R, 47 Q

[56] References Cited
UNITED STATES PATENTS

| | | | |
|---|---|---|---|
| 3,250,721 | 5/1966 | DePaolis et al. | 106/47 R |
| 3,549,554 | 12/1970 | Hirayama et al. | 252/301.4 P |
| 3,580,859 | 5/1971 | Buzhinsky et al. | 252/301.4 P |
| 3,731,226 | 5/1973 | Switzer et al. | 331/94.5 E |
| 3,846,142 | 11/1974 | Buzhinsky et al. | 106/47 Q |
| 3,979,322 | 9/1976 | Alexeer et al. | 106/47 Q |

*Primary Examiner*—Winston A. Douglas
*Assistant Examiner*—Mark Bell
*Attorney, Agent, or Firm*—Millen & White

[57] ABSTRACT

A neodymium-doped phosphate laser glass composition having a low threshold for stimulated emission, a negative temperature coefficient of refractive index, high acid resistance and homogeneity even in large structures comprises $P_2O_5$, $Na_2O$ or $K_2O$, $Al_2O_3$, $Nd_2O_3$, and optionally, F or RO, wherein R is Mg, Ba, Ca, Sr or Zn.

8 Claims, No Drawings

ATHERMAL LASER GLASS

BACKGROUND OF THE INVENTION

The invention relates to a laser glass with particularly low threshold energy for stimulated emission and negative temperature coefficient of refractive index.

In another aspect, this invention relates to a method for making neodymium-doped phosphate glass suitable for fabrication into rods for lasers.

In another aspect, this invention relates to lasers in which the active medium is a neodymium-doped phosphate glass.

The term "laser" is an acronym for "light amplification by the stimulated emission of radiation". The amplified light may include visible light, as well as the infrared and ultraviolet portions of the frequency spectrum and is within the wavelength band of $10^2$ to $10^6$ Angstroms.

Operation of a laser depends on interaction between matter and radiation which occurs when matter, that is, atoms or molecules, absorbs or emits photons. Atoms or molecules in the ground or non-radiating state, i.e., atoms or molecules which do not emit energy, have an energy of a fixed amount or level. If an atom in the ground state is excited, i.e., interacts with an incident photon, the atom becomes in a higher or excited state, as long as the energy of the photon is at least equal to the energy difference between the ground and excited states. When the energy level of an atom or molecule is changed from a higher energy state to a lower energy state, a photon of radiation may be emitted. The energy of the emitted photon is equal to the difference in the energy between these states.

An atom in an excited state can emit a photon spontaneously and revert to its ground state or some intermediate lower state. However, while the atom is still excited, it can be stimulated to emit a photon by interaction with an incident photon of energy equal to that of the photon which would be emitted spontaneously. The result is that the incoming photon or electromagnetic radiation wave is augmented by the one given up by the emitting atom. This released wave falls in phase with the wave which triggered its release, that is, an amplifying action called stimulated emission is brought about.

Usually, more atoms are in lower energy states than in the various higher energy states. But, in a laser, the energy level distribution of electrons is altered by a process called "pumping," so that there are more atoms in higher levels than in lower levels. Pumping is the injection of some form of energy, e.g., electromagnetic energy, into a population of atoms, a significant number of which absorb energy and are elevated to excited states. Thus, incident photons of the lowest energy can produce more downward than upward energy level transitions and stimulated emission can result.

In a laser, a suitable active material, which can be a solid, a liquid or a gas, is enclosed in a cavity resonator which has at least two separated reflecting walls. A wave starting anywhere within the cavity grows in amplitude until the wave reaches either wall and is thereupon reflected back into the medium. Although there are, in practice, losses from imperfect reflections, absorption and scattering, a wave will build up in the resonator if the amplification by stimulated emission is larger than the losses. In the present invention, the active material is a glass rod and the two separated reflecting walls are mirrors.

For constant operating conditions with rapid impulse sequence, it is desirable to have a laser glass with low threshold energy and negative temperature coefficient of refractive index. In the processing of materials and range-finders, it would be desirable to produce laser pulse sequences of about one or more pulses per minute. It is also important in this connection that the pulses be of equal strength.

If a laser material has a positive temperature coefficient of refractive index, the laser beam becomes increasingly divergent as operation proceeds owing to heating of the laser rod by pumping radiation. Temperature differences between the marginal zone and the interior of the rod can also be caused by this radiation. Thus, after the initiation of the light pumping, the outer zone of the rod can become warmer than the inner zone. When the temperature coefficient of the laser glass is positive, the optical path length in the marginal zones becomes greater. This causes an effect which is similar to the introduction of a concave lens into a parallel beam so that the beam emerging from the rod becomes divergent. Generally, crystals and glasses have a positive temperature coefficient, so that their use in laser rods is unsatisfactory.

However, there are glasses with negative temperature coefficients. The optical path length is then less strongly influenced by the temperature. The variation of the optical path length $\Delta s$ caused by a temperature difference $\Delta T$ in the rod is:

$$\Delta s = \left[ \alpha n + \frac{dn}{dT} \right] \Delta T \times L \qquad \text{a)}$$

$$\Delta s = \left[ \alpha(n-1) + \frac{dn}{dT} \right] \Delta T \times L \qquad \text{b)}$$

when a) the mirrors are vapor deposited on the end faces of the rod,
and b) when the resonator mirror is erected separately from the laser rod, respectively. In these formulae:
$\alpha$ = thermal expansion
$n$ = refractive index
$L$ = rod length.

It is seen from these formulae that the path length difference is smaller when the temperature coefficient of the laser rod is negative.

Apart from the low threshold energy of the laser effect and the negative temperature coefficient of the refractive index, the following properties are also required for active solid laser body material: good chemical resistivity; low thermal expansion, no tendency of the melt to crystallize and a small tendency to striation; and freedom from particles which absorb and could lead to destruction of the glass with excessive pulse generation.

It is known that phosphate glasses have a relatively low threshold value for the laser effect. See, for example, O. K. Deutschbein, C. C. Pautrat and I. M. Svirchevsky, Revue de Physique Applique, Volume 2, 1967, 29-37; DePaolis, et al., U.S. Pat. No. 3,250,721; Hirayama et al., U.S. Pat. No. 3,549,554; and Buzhinsky et al., U.S. Pat. No. 3,846,142. However, phosphate glasses usually have one or more of the following disadvantages: low chemical stability or even high solubility in water; high thermal expansion, up to 190 × $10^{-7}/°$ C.; and inhomogeneity in pieces of relatively large dimensions. However, these objections are avoided with the glasses of this invention.

SUMMARY OF THE INVENTION

It has been found, in accordance with this invention, that an athermal neodymium-doped phosphate glass composition comprises:

|  | % by wt. | Mol. % |
|---|---|---|
| $P_2O_5$ | 65 – 83 | 54 – 71 |
| $Na_2O$ and/or $K_2O$ | 7 – 17 | 16 – 32 |
| $Al_2O_3$ | 4 – 15 | 5 – 18 |
| $Nd_2O_3$ | 0.5 – 15 | 0.08 – 6 |
| MgO and/or BaO, CaO, SrO, ZnO | 0 – 8 | 0 – 20 |
| Fluorine | 0 – 2 | 0 – 2 |

In this composition, the fluorine is added in the form of fluorides. This glass is preferably formed into the shap of a rod, and especially a rod having a circular cross section.

In the laser embodiment of this invention, the laser is conventional as it comprises a transparent cavity having reflective surfaces at opposite ends thereof, an active medium in the transparent cavity and a light-emitting means surrounding said transparent cavity, and the improvement comprises employing the above described neodymium doped glass, preferably in the form of a rod, as said active medium.

Upon further study of the remainder of the specification and appended claims, other objects and advantages of the present invention will become apparent.

DETAILED DESCRIPTION

Within the broad ranges set forth above, it is preferred for the glasses of this invention to contain on a weight basis about 68% to about 80% of $P_2O_5$.

It is also preferred for the glasses of the invention to contain on a weight basis about 9% to about 13% $Na_2O/K_2O$. $Na_2O$ is preferred because it leads to a larger induced emission cross section.

It is also preferred for the glasses of this invention to contain on a weight basis about 4% to about 11% of $Al_2O_3$.

It is also preferred for the glasses of this invention to contain on a weight basis about 0.5% to about 8% $Nd_2O_3$.

Whereas the glasses of this invention do not require MgO and/or BaO, CaO, SrO or ZnO, as seen by the above table, it is nevertheless preferable to employ said divalent metal oxides for particular glass compositions. For example, MgO in a preferred amount of about 0.5% to about 3% by weight, inparts to the glass improved stability against crystallization. BaO, SrO, CaO, MgO and/or fluorine are useful in imparting to the glass a low temperature coefficient of the refractive index.

It is also important that the molar ratio of the alkali metal oxide ($Na_2O$ and/or $K_2O$) to $P_2O_5$ be between 0.25 and 0.5 especially between 0.35 and 0.5. The importance of this molar ratio is drawn from the fact that for such a molar ratio the laser effect and the temperature coefficient of refraction are both optimal.

The especially preferred glass compositions of this invention are as follows:

|  | % by wt. |
|---|---|
| $P_2O_5$ | 68 – 80 |
| $Na_2O$ and/or $K_2O$ | 8 – 16 |
| $Al_2O_3$ | 4 – 11 |
| $Nd_2O_3$ | 1.0 – 8 |
| MgO and/or BaO, CaO, SrO, ZnO | 0 – 5 |

When fabricated into rods for laser applications, it is apparent that the glass rods can be of any conventional size, e.g. about 50 to 500 mm in length and about 2 to 25 mm in diameter. Because of the particular properties of the glasses of this invention, glass rods of approximately the following dimensions have particular advantages over glass rods of an equivalent dimension and of a different composition:

a length of about 75 to 300 mm and
a diameter of about 4 to 20 mm.

The glass and glass rods are produced by the following method: For a batch of about 10 kg the following optically pure raw materials are blended:

| oxides | % by weight | raw material | quantity (kg) |
|---|---|---|---|
| $P_2O_5$ | 71.44 | $P_2O_5$ | 8.57 |
| $Na_2O$ | 12.55 | $Na_2CO_3$ | 2.58 |
| $Al_2O_3$ | 9.88 | AlO(OH) | 1.57 |
| $Nd_2O_3$ | 5.93 | $Nd_2O_3$ | 0.72 |
| $As_2O_3$ | 0.20 | $As_2O_3$ | 0.024 |

The blend is melted at 1150° – 1190° C in 8 hours. When the melt has become clear it is refined for 7 hours at 1190° C and stirred for 1 hour to reach the discharge temperature of 1125° C. The melt is then poured into preheated molds having rectangular cross section. The glass bar is ground to obtain a rod with circular cross section. The end faces of the rod are polished to become plane and parallel.

The glasses of the invention may also be used in the form of discs rather then in the form of rods, as described in Applied Optics, Vol. 12, 1973, page 927 and 928.

With respect to the lasers that incorporate the glasses of this invention, they are conventional, and for specific details of such lasers, attention is invited to the following references which are incorporated herein: Avecci and Schulz-Dubois, "Laser Handbook", and Heard, "Laser Parameter Handbook".

EXAMPLES

Without further elaboration, it is believed that one skilled in the art can, using the preceding description, utilize the present invention to its fullest extent. In the following Table I, there are set forth preferred specific embodiments of the glasses of this invention, but they are to be construed as merely illustrative, and not limitative of the remainder of the disclosures or the appended claims. As noted by the "laser threshold energy (J)", glasses A and B are especially preferred.

Table 1

Glass Compositions (% by weight) and Properties

| Glass | A | B | C | D | E | F | G |
|---|---|---|---|---|---|---|---|
| $P_2O_5$ | 71.5 | 70.0 | 75.5 | 69.2 | 75.5 | 71.0 | 75.1 |
| $Na_2O$ | 12.6 | 12.2 | 11.9 | | 11.0 | 15.5 | 9.2 |
| $K_2O$ | | | | 11.8 | | | |
| $Al_2O_3$ | 9.9 | 9.7 | 6.6 | 8.8 | 4.7 | 4.7 | 4.8 |
| MgO | | | | 4.2 | 2.8 | 2.8 | 4.9 |
| $Nd_2O_3$ | 6.0 | 8.0 | 6.0 | 6.0 | 6.0 | 6.0 | 6.0 |
| Relative luminescence intensity | 495 | 495 | 280 | 495 | 135 | 245 | 120 |
| Luminescence time ($\mu s$) | 210 | 130 | 130 | 230 | 90 | 110 | 100 |
| Laser threshold energy (J) | 17 | 17 | * | 20 | * | * | * |
| Absorption cross-section of the induced emission ($10^{-20} cm^2$) | 3.2 | 3.2 | * | 2.0 | * | * | * |
| Resistance to climatic change | 3 | 3 | 3 | 3 | 3 | 3 | 3 |
| Acid Class | 2 | 2 | 2 | 2 | 2 | 2 | 2 |
| Therm. expansion ($10_+^6/^\circ C$) | 10.3 | 10.0 | 11.5 | 9.3 | * | * | * |
| Refractive index (587 nm) | 1.522 | 1.521 | 1.514 | 1.518 | 1.516 | 1.515 | 1.521 |
| Temp. coefficient of the refractive index ($10^{-6}/^\circ C$) | −2.0 | −2.1 | −2.0 | −1.9 | * | * | * |

*designates that value is unknown.

The laser threshold energy was measured with rods having a diameter of 6 mm. and a length of 76 mm. Energisation was effected with a Xenon flashlamp light-emitting means in an elliptical reflector and an impulse time of 480 $\mu s$. The two resonator mirrors had a reflectance of 99 and 89%, respectively. With the same arrangement, known laser silicate glasses, e.g., those of German Auslegeschrift No. 1,255,215, have threshold values for the laser effect of 30 – 35 J. By contrast, glass A of Table 1 has only half this value. A rod of glass A with a diameter of 3 mm. was also energised, using two resonator mirrors, both of 99% reflectance, and a shorter pulse (170 $\mu s$). A threshold value for the laser effect of 2 J was then obtained.

The effective cross-section of the induced emission of silicate glasses is in the range of $1 \times 10^{-20}$ cm$^2$; the best glasses according to the invention has a value which is three times higher.

The absorption cross-section of the induced emission was determined by measuring the absorption of the glass at a wavelength 1.06 $\mu$ at elevated temperature (up to about 400° C.) in accordance with Appl. Optics, Volume 3, 1964, 433.

The resistance to climatic change and acid class were established in accordance with the methods used for optical glasses (Schott-Katalog 3060/72d IX 72 o.P). Glasses having the highest resistance to acids and climatic change are rated in Class 1, the poorest in Class 4 (climatic change) or Class 5 c (acid resistance). Many phosphate-based glasses which have reasonable threshold values for the laser effect are in Classes 5a to 5c with respect to acid resistance. Therefore, the manufacture of phosphate glasses in acid Class 2 (glasses A and B of Table 1), which simultaneously have a very good laser effect, i.e., a low threshold value, is an important technical advance.

An additional advantage of the compositions of this invention is the negative temperature coefficient which, as mentioned, has the effect that the laser beam remains parallel, even with strong pumping.

The rods of the examples in Table I were produced by the process, described on page 8.

The preceding examples can be repeated with similar success by substituting the generically or specifically described invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A neodymium-doped phosphate laser glass composition having a low threshold for stimulated emission and a negative coefficient of the refractive index, comprising from about 65 to about 83% by weight of $P_2O_5$; from about 7 to about 17% by weight of $Na_2O$, $K_2O$ or mixtures thereof; from about 4 to about 15% by weight of $Al_2O_3$; up to about 8% by weight of an oxide RO, wherein R is Mg, Ba, Ca, Sr or Zn; up to about 2% by weight of F; and from about 0.5 to about 15% by weight of $Nd_2O_3$ and the molar ratio of $Na_2O$ or $K_2O$: $P_2O_5$ is between 0.25 and 0.5.

2. The composition of claim 1, comprising from about 68 to about 80% by weight of $P_2O_5$; from about 8 to about 16% of $Na_2O$, $K_2O$ or mixtures thereof; from about 4 to about 11% by weight of $Al_2O_3$; up to about 6 by weight of an oxide RO, wherein R is Mg, Ba, Ca, Sr or Zn; up to about 2% by weight of F; and from about 0.5 to about 10% by weight of $Nd_2O_3$ and the ratio of $Na_2O$ or $K_2O$: $P_2O_5$ is from 0.35 to 0.5.

3. The composition of claim 1, comprising 71.5% by weight of $P_2O_5$, 12.6% by weight of $Na_2O$, 9.9% by weight of $Al_2O_3$ and 6.0% by weight of $Nd_2O_3$.

4. The composition of claim 1, comprising 69.2% by weight of $P_2O_5$, 11.8% by weight of $K_2O$, 8.8% of $Al_2O_3$, 4.2% by weight of MgO and 6.0% by weight of $Nd_2O_3$.

5. In a laser comprising a transparent cavity having reflective surfaces at opposite ends thereof, an active medium, and light-emitting means surrounding said transparent cavity for pumping the medium the improvement which comprises employing as said active medium a glass composition according to claim 1.

6. In a laser comprising a transparent cavity having reflective surfaces at opposite ends thereof, an active medium, and light-emitting means surrounding said transparent cavity for pumping the medium the improvement which comprises employing as said active medium a glass composition according to claim 2.

7. In a laser comprising a transparent cavity having reflective surfaces at opposite ends thereof, an active medium, and light-emitting means surrounding said transparent cavity for pumping the medium the improvement which comprises employing as said active medium a glass composition according to claim 3.

8. In a laser comprising a transparent cavity having reflective surfaces at opposite ends thereof, an active medium, and light-emitting means surrounding said transparent cavity for pumping the medium the improvement which comprises employing as said active medium a glass composition according to claim 4.

* * * * *